(12) United States Patent
Mori et al.

(10) Patent No.: US 11,413,585 B2
(45) Date of Patent: Aug. 16, 2022

(54) MEMBRANE ELEMENT AND MEMBRANE SEPARATION DEVICE

(71) Applicant: Kubota Corporation, Osaka (JP)

(72) Inventors: Shigeyuki Mori, Amagasaki (JP); Yoshio Matsuzaki, Amagasaki (JP); Jun Maeda, Amagasaki (JP); Yasuhiro Okawa, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 36 days.

(21) Appl. No.: 16/912,286

(22) Filed: Jun. 25, 2020

(65) Prior Publication Data

US 2020/0324251 A1 Oct. 15, 2020

Related U.S. Application Data (63) Continuation of application No. PCT/JP2018/047209, filed on Dec. 21, 2018.

(30) Foreign Application Priority Data

Dec. 28, 2017 (JP) .............................. JP2017-252740

(51) Int. Cl.
*B01D 69/10* (2006.01)
*B01D 63/08* (2006.01)
(Continued)

(52) U.S. Cl.
CPC ........... *B01D 69/10* (2013.01); *B01D 63/081* (2013.01); *B01D 63/082* (2013.01); *B01D 69/06* (2013.01);
(Continued)

(58) Field of Classification Search
CPC .... B01D 63/08; B01D 63/081; B01D 63/082; B01D 69/06; B01D 69/10; B01D 71/26;
(Continued)

(56) References Cited

U.S. PATENT DOCUMENTS

| 5,409,515 A | 4/1995 | Yamamoto | |
|---|---|---|---|
| 2004/0182775 A1* | 9/2004 | Hirokawa | B01D 63/10 210/321.85 |

(Continued)

FOREIGN PATENT DOCUMENTS

| JP | 2000-42322 | 2/2000 |
|---|---|---|
| JP | 2011-5455 | 1/2011 |
| JP | 2011-519716 | 7/2011 |
| WO | 2006/015461 | 2/2006 |
| WO | 2009/127345 | 10/2009 |
| WO | 2011/004743 | 1/2011 |
| WO | 2013/146838 | 10/2013 |

OTHER PUBLICATIONS

International Search Report from International Application No. PCT/JP2018/047209 dated Mar. 19, 2019.

*Primary Examiner* — Pranav N Patel
(74) *Attorney, Agent, or Firm* — Beyer Law Group LLP (57) ABSTRACT

A membrane element includes a filtration membrane and a flowpath member joined thereto. The flowpath member is made of yarn arranged into a three-dimensional structure, and includes inner spaces through which a permeated liquid permeated through the filtration membrane flows, and an outer bonding surface joined to the filtration membrane. At least part of the yarn forming the outer bonding surface is a low-melting point yarn having a softening point lower than that of a material forming the filtration membrane, or the yarn forming the outer bonding surface is formed by twisting a plurality of constituent yarns, and at least one of the constituent yarns is a low-melting point yarn having a softening point lower than that of the material forming the filtration membrane.

18 Claims, 8 Drawing Sheets

(51) Int. Cl.
*B01D 69/06* (2006.01)
*B01D 71/36* (2006.01)
*C02F 3/12* (2006.01)

(52) U.S. Cl.
CPC ............ *B01D 71/36* (2013.01); *C02F 3/1273* (2013.01); *B01D 2313/08* (2013.01); *B01D 2315/06* (2013.01); *B01D 2325/40* (2013.01)

(58) Field of Classification Search
CPC .... B01D 71/36; B01D 71/48; B01D 2313/08; B01D 2313/156; B01D 2315/06; B01D 2239/065; B01D 2239/0654; B01D 2239/0681; B01D 2239/0636; B01D 2239/083; B01D 2325/40; C02F 3/1273; Y02W 10/10
See application file for complete search history.

(56) References Cited

U.S. PATENT DOCUMENTS

| | | | |
|---|---|---|---|
| 2006/0151094 A1* | 7/2006 | Angelini | B01D 69/10 156/176 |
| 2011/0024348 A1* | 2/2011 | Meyer-Blumenroth | B01D 63/081 210/435 |
| 2012/0111784 A1 | 5/2012 | Morita | |
| 2013/0299412 A1* | 11/2013 | Masutani | C02F 1/44 210/321.84 |
| 2017/0056836 A1* | 3/2017 | Voigt | B01D 39/1692 |
| 2020/0095709 A1* | 3/2020 | Nakano | D03D 15/573 |

* cited by examiner

*Prior Art*

MEMBRANE ELEMENT AND MEMBRANE SEPARATION DEVICE

CLAIM OF PRIORITY

This application is a Continuation of International Patent Application No. PCT/JP2018/047209, filed on Dec. 21, 2018, which claims priority to Japanese Patent Application No. 2017-252740, filed on Dec. 28, 2017, each of which is hereby incorporated by reference.

BACKGROUND OF THE INVENTION

1. Field of the Invention

The present invention relates to a membrane element for separating sludge and treated water employed in a field of membrane bioreactors (MBR) using activated sludge, and a submersions-type membrane separation device provided with such membrane elements.

2. Description of the Related Art

Figure 9:
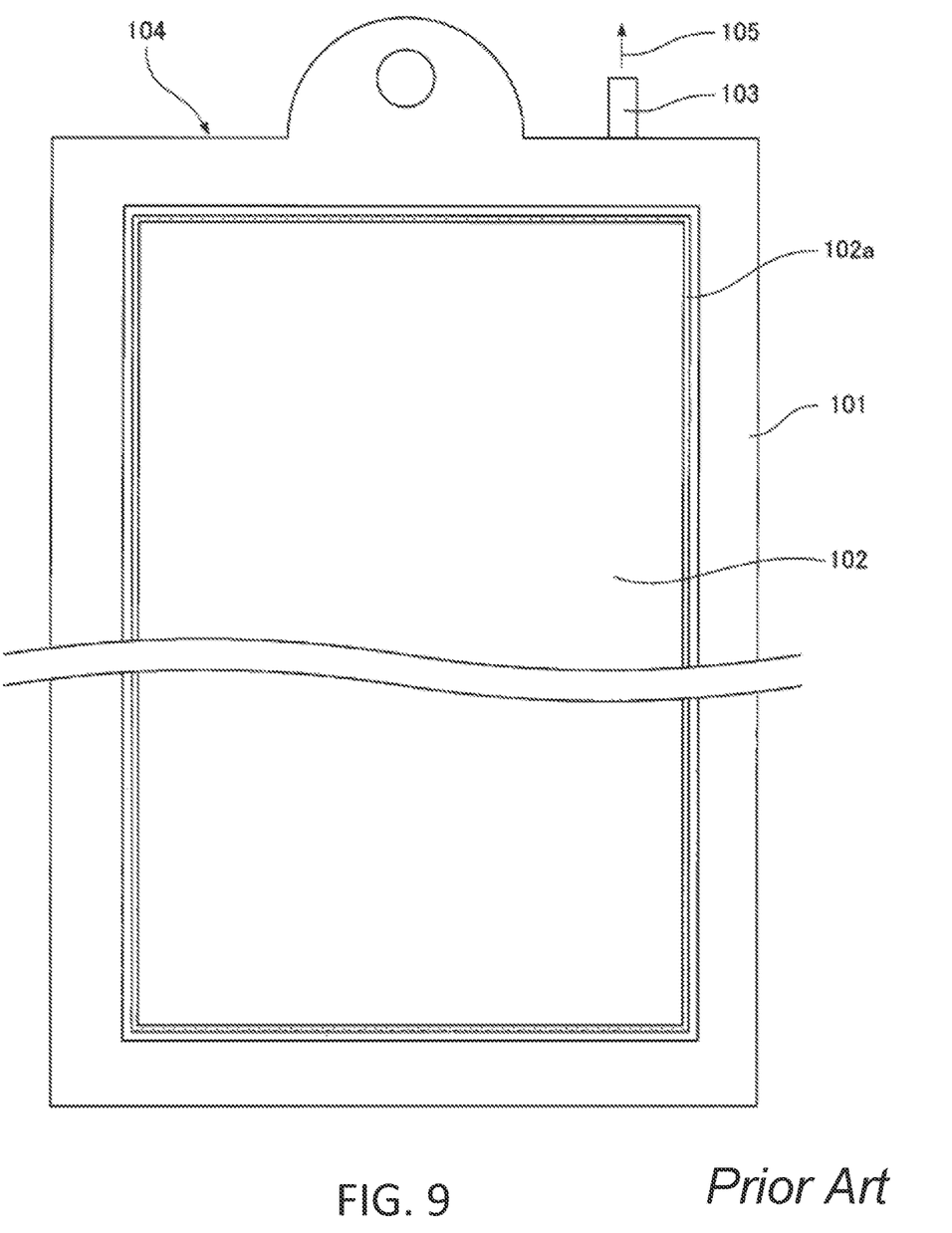
FIG. 9 is a front view of a conventional membrane element.
Figure 10:
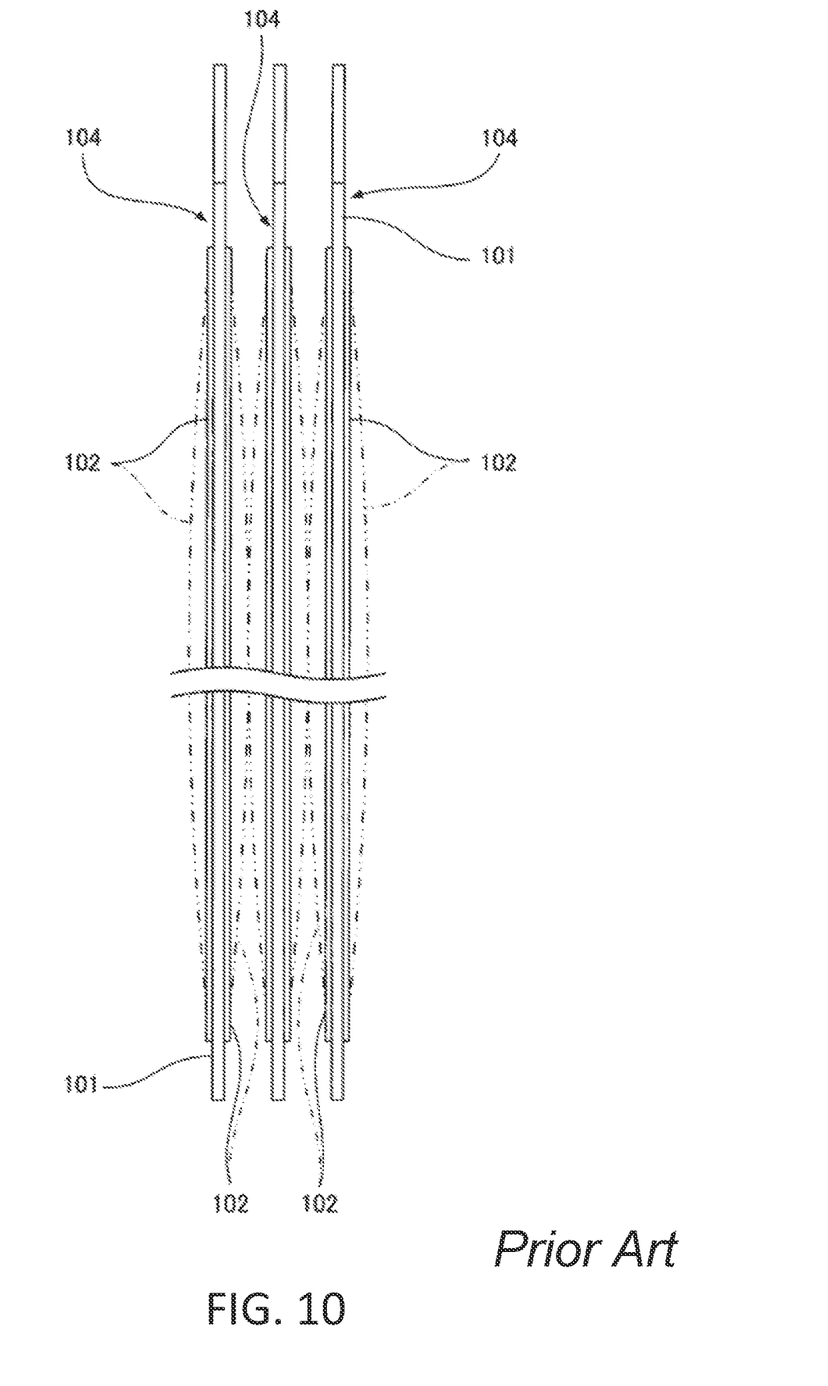
FIG. 10 is a side view of the conventional membrane element, showing a state in which a plurality of membrane elements are arranged at predetermined intervals.

FIG. 9 shows an example of a conventional membrane element of this type, in which a filtration membrane 102 is joined to both sides of a filter plate 101 made of a resin. A peripheral edge portion 102a of the filtration membrane 102 is bonded to the filter plate 101 by thermal welding or ultrasonic welding. A flow path (not shown) for permeated liquid is formed between the filter plate 101 and the filtration membrane 102 and inside the filter plate 101, and a permeated liquid outlet 103 in communication with the permeated liquid flow path is provided at an upper edge of the filter plate 101. As shown in FIG. 10 with the solid line, a plurality of membrane elements 104 such as that which are described above are arranged in a membrane case (not shown) at predetermined intervals.

During the filtration operation, liquid to be treated is filtered by passing through the filtration membrane 102 from the primary side to the secondary side, and then flows through the permeated liquid flow path as the permeated liquid 105, to be taken out through the permeated liquid outlet 103. When the filtration operation is stopped and each membrane element 104 is backwashed, backwashing water is injected into the permeated liquid flow path from the permeated liquid outlet 103. As a result, the backwash water passes through the filtration membrane 102 from the secondary side to the primary side, whereby the filtration membrane 102 is backwashed.

In such a membrane element 104, not the entire filtration membrane 102 is fixed to the filter plate 101, but only the peripheral edge portion 102a of the filtration membrane 102 is welded to the filter plate 101. Thus, during the backwashing of the filtration membrane 102, as shown in FIG. 10, the filtration membrane 102 may bulge outwardly (to the primary side) and come into contact with another filtration membrane 102 of an adjacent membrane element 104, as indicated by the two-dot chain line. If the filtration membranes 102 of the adjacent membrane elements 104 bulge out and come into contact with each other, it may decrease the effectiveness of the backwashing. Furthermore, introducing the backwash water to the secondary side for a long period of time to swell the filtration membrane 102 may cause the welded portion of the peripheral edge portion 102a of the filtration membrane 102 to break open.

Figure 11:
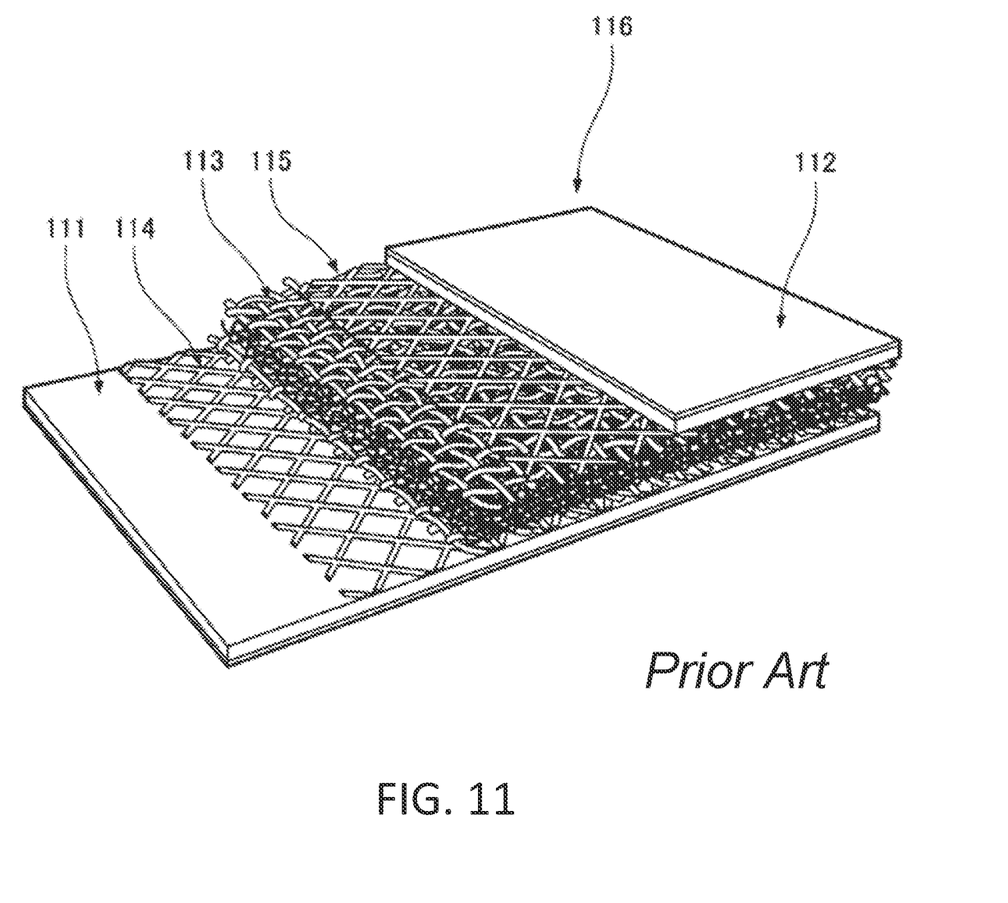
FIG. 11 is a perspective view with a partial cutaway showing the structure of another conventional membrane element.

In order to solve such problems, such a membrane element 116 as shown in FIG. 11 has been proposed, which includes a first filtration membrane 111, a second filtration membrane 112, a drainage fabric 113 provided between the filtration membranes 111 and 112, an adhesive net 114 for bonding the first filtration membrane 111 and the drainage fabric 113, and an adhesive net 115 for bonding the second filtration membrane 112 and the drainage fabric 113. The drainage fabric 113 is a spacer fabric knitted into a three-dimensional structure forming loops.

The drainage fabric 113 and the adhesive nets 114 and 115 are laminated between the first filtration membrane 111 and the second filtration membrane 112. By heat-rolling the laminated structure, the adhesive nets 114 and 115 are temporarily melted, whereby the first filter membrane 111 and the drainage fabric 113 are bonded via the first adhesive net 114, while the second filter membrane 112 and the drainage fabric 113 are bonded via the second adhesive net 115 so as to form the completed membrane element 116.

For example, International Publication No. WO 2009/127345 A1 (Japanese Patent Publication No. 2011-519716) illustrates such a membrane element 116 as described above. In addition, International Publication No. WO 2006/015461 A1 describes a method for forming a filtration membrane layer by coating a liquid membrane material resin (hereinafter referred to as a "dope") dissolved in a solvent directly onto to one or both sides (faces) of a spacer fabric, and performing a phase separation.

BRIEF DESCRIPTION OF THE INVENTION

However, in such a conventional system described in International Publication No. WO 2009/127345 A1, as shown in FIG. 11, the adhesive nets 114 and 115 as separate elements are necessary in addition to the drainage fabric 113 and the first and second filtration membranes 111 and 112 in order to manufacture the membrane element 116, which disadvantageously increases the number of parts constituting the membrane element 116.

With respect to International Publication No. WO 2006/015461 A1, inner spaces (channels) of the spacer fabric serve as flow passages for the permeated liquid that has passed through the filtration membrane layer. However, when the dope is directly applied to the surface of the spacer fabric and if the viscosity of the dope is low, the dope may enter such inner spaces (channels) of the spacer fabric and solidify therein, thereby impeding the flow of the permeate liquid inside the spacer fabric.

Accordingly, an object of the present invention is to provide a membrane element and a membrane separation device capable of reducing the number of constituent parts.

In accordance with one aspect of the present invention, a membrane element includes a filtration membrane and a flowpath member joined to the filtration membrane, where the flowpath member is formed of threads arranged into a three-dimensional structure. The flow path material includes (a) inner spaces formed therein through which permeated liquid permeated through the filtration membrane flows, and (b) an outer bonding surface joined to the filtration membrane. At least part of the threads forming the outer bonding surface is made of low-melting point yarn having a softening point lower than that of a material forming the filtration membrane.

In accordance with the configuration described above, the filtration membrane is directly disposed onto the bonding surface of the flowpath member, and the flowpath member and the filtration membrane thus arranged are heated to such a temperature that is equal to or higher than the softening point of the low-melting point yarn forming the bonding surface, and lower than the softening point of the material forming the filtration membrane. As a result, the low-melting point yarn of the bonding surface is softened and the resin of the low-melting point yarn is entangled with the filtration membrane, whereby the filtration membrane is joined to the bonding surface of the flowpath member. Accordingly, since the membrane element can be manufactured with the flowpath member and the filtration membrane alone, it is possible to eliminate the need of a bonding-dedicated member such as an adhesive net, thereby reducing the number and types of the constituent parts to form the membrane element.

Furthermore, since it is unnecessary to heat the low-melting point yarn up to the softening point of the filtration membrane in order to soften the low-melting point yarn, softening of the filtration membrane can be prevented, thereby preventing changes in the pore size distribution of the filtration membrane.

In accordance with the filtration membrane in another aspect of the present invention, the flowpath member is made of yarn arranged into a three-dimensional structure, where the flowpath member includes (a) inner spaces through which permeated liquid permeated through the filtration membrane flows, and (b) an outer bonding surface joined to the filtration membrane. The threads forming the outer bonding surface are formed by twisting a plurality of constituent threads, and at least one of the constituent threads is a low-melting point yarn having a softening point lower than that of a material forming the filtration membrane.

According to the configuration described above, the filtration membrane is directly disposed on the bonding surface of the flowpath member, and the thus-arranged flowpath member and filtration membrane are heated to such a temperature which is equal to or higher than the softening point of the low-melting point yarn forming the bonding surface, and lower than the softening point of the material forming the filtration membrane. As a result, the low-melting point yarn on the bonding surface is softened such that the resin of the low-melting-point yarn is entangled with the filtration membrane, whereby the filtration membrane is joined to the bonding surface of the flowpath member. Accordingly, since the membrane element can be manufactured with the flowpath member and the filtration membrane alone, the need of a bonding-dedicated member, such as an adhesive net, is eliminated, whereby the number and types of constituent parts forming the membrane element can be reduced. In addition, softening of the filtration membrane can be prevented, thereby preventing changes in the pore size distribution of the filtration membrane.

In accordance with the filtration membrane in another aspect of the present invention, the low-melting point yarn is formed of a core material and a sheath material covering the core material, where the sheath material has a softening point lower than that of the material forming the filtration membrane, while the core material has a softening point higher than that of the sheath material.

According to this configuration, the filtration membrane is disposed on the bonding surface of the flowpath member, and the flowpath member and the filtration membrane are heated to a temperature which is equal to or higher than the softening point of the sheath material of the low-melting point yarn forming the bonding surface, and lower than the softening point of the core material thereof. As a result, the sheath material made of the low-melting point yarn is softened and the resin of the sheath material is entangled with the filtration membrane, whereby the filtration membrane is joined to the bonding surface of the flowpath member.

In addition, since the core material is prevented from softening during the heating process, the core material may be formed using a resin stronger than the sheath material of the yarn so as to improve the strength of the bonding surface, thereby increasing the rigidity of the flowpath member.

In accordance with one embodiment of the present invention, the material of the low-melting point yarn is a polyolefin resin. In accordance with one embodiment of the present invention, the sheath material is a polyolefin resin.

In accordance with the membrane element in another aspect of the present invention, the flowpath member includes coupling threads coupled to the outer bonding surface, where the coupling threads form the inner spaces through which the permeated liquid flows. The coupling threads have a softening point higher than that of the low-melting point yarn forming the outer bonding surface.

According to this configuration, the filtration membrane is disposed on the bonding surface of the flowpath member, and the flowpath member and the filtration membrane are heated to the temperature which is equal to or higher than the softening point of the low-melting point yarn, and lower than the softening point of the coupling threads. As a result, softening of the coupling threads of the flowpath member is prevented such that the inner spaces are securely formed between the coupling threads, thereby allowing the permeated liquid that has passed through the filtration membrane to flow through the inner spaces within the flowpath member.

In accordance with one embodiment of the present invention, the material forming the coupling threads is polyester resin. In accordance with one embodiment of the present invention, the filtration membrane has a porous membrane made of polytetrafluoroethylene (PTFE).

In accordance with another aspect of the present invention, a membrane separation device includes a plurality of membrane elements each of which is according to one of the above-described membrane elements, and a support member supporting the plurality of membrane elements. The support member has a water collecting space therein, such that an end of each membrane element is inserted into the water collecting space, whereby the permeated liquid flows into the water collecting space through the inner spaces of the flowpath member.

According to the above-described membrane separation device, by performing the filtration operation with the membrane separation device immersed in liquid to be treated, the liquid to be treated is filtered as passing through the filtration membrane of the membrane element from the primary side to the secondary side, and then, as the permeated liquid, flows into the inner spaces of the flowpath member through the bonding surface thereof, and then flows into the water collecting space of the support member through the inner spaces of the flowpath member.

As described above, according to the present invention, since the membrane element can be formed by the flowpath member and the filtration membrane, a specific member for bonding, such as an adhesive net, is not required, whereby the number and types of the components forming the membrane element can be reduced.

DETAILED DESCRIPTION OF EMBODIMENTS OF THE INVENTION

Embodiments of the present invention will be described below with reference to the drawings.

First Embodiment

Figure 1:
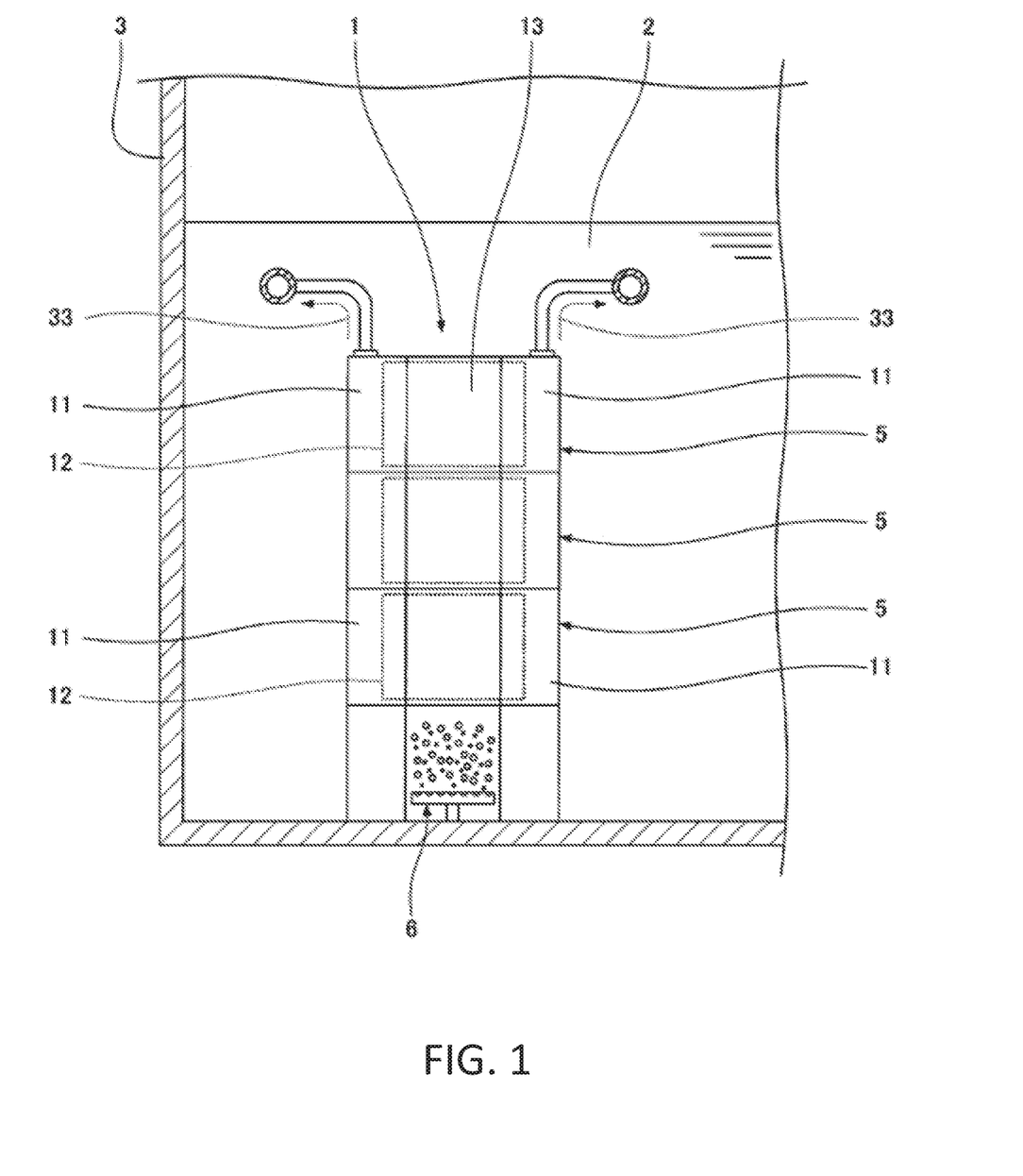
FIG. 1 is a front view of a membrane separation apparatus using a plurality of membrane separation devices according to a first embodiment of the present invention.

In the first embodiment, as shown in FIG. 1, an immersion type membrane separation device 1 is installed in a treatment tank 3 and immersed in liquid to be treated 2 such as organic waste water so as to perform membrane filtration operation. The membrane separation device 1 includes a plurality of membrane separation devices 5 (also referred to as membrane filtration modules) which are vertically stacked, and an air diffuser 6 is provided at the bottom under the stack of the membrane separation devices 5.

Figure 2:
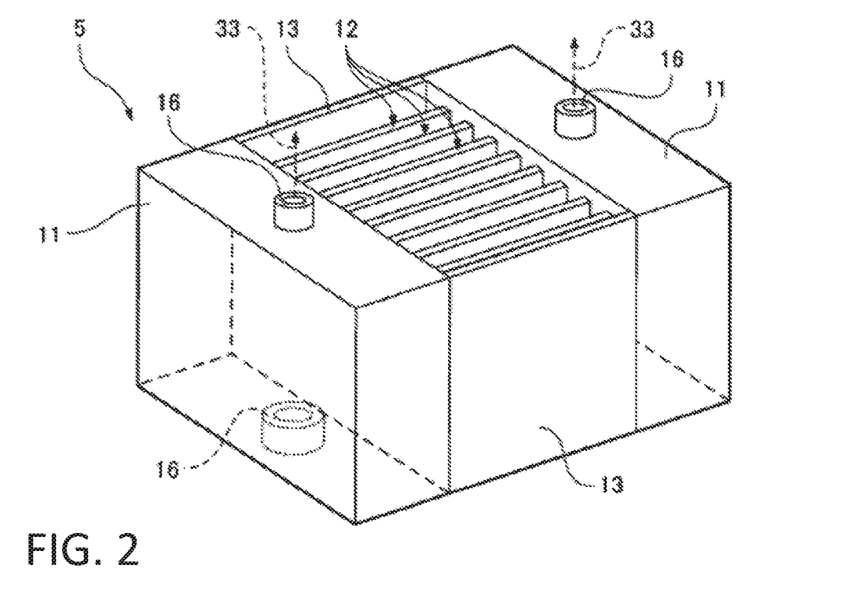
FIG. 2 is a perspective view of the membrane separation device according to the first embodiment of the present invention.
Figure 3:
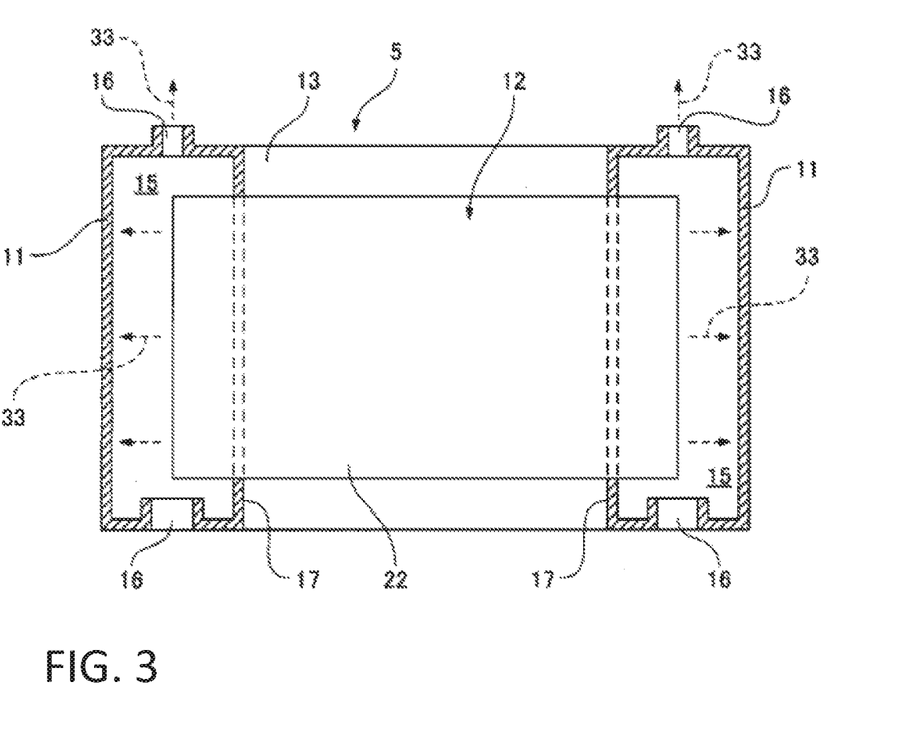
FIG. 3 is a sectional view of the membrane separation device according to the first embodiment of the present invention.

As shown in FIGS. 2 and 3, each membrane separation device 5 includes a pair of left and right water collecting cases 11 (an example of a supporting member), a plurality of membrane elements 12 supported between the pair of water collecting cases 11, and a pair of front and rear connecting plates 13. The water collecting case 11 is a hollow member having a water collecting space 15 therein. The front and rear connecting plates 13 are provided between the front end portions and between the rear end portions of the pair of water collecting cases 11, respectively. The water collecting space 15 in the water collecting case 11 of the membrane separation device 5 is in communication with another water collecting space 15 of the water collection case of an upper or lower membrane separation device 5 adjacent thereto via a communication port 16.

Figure 4:
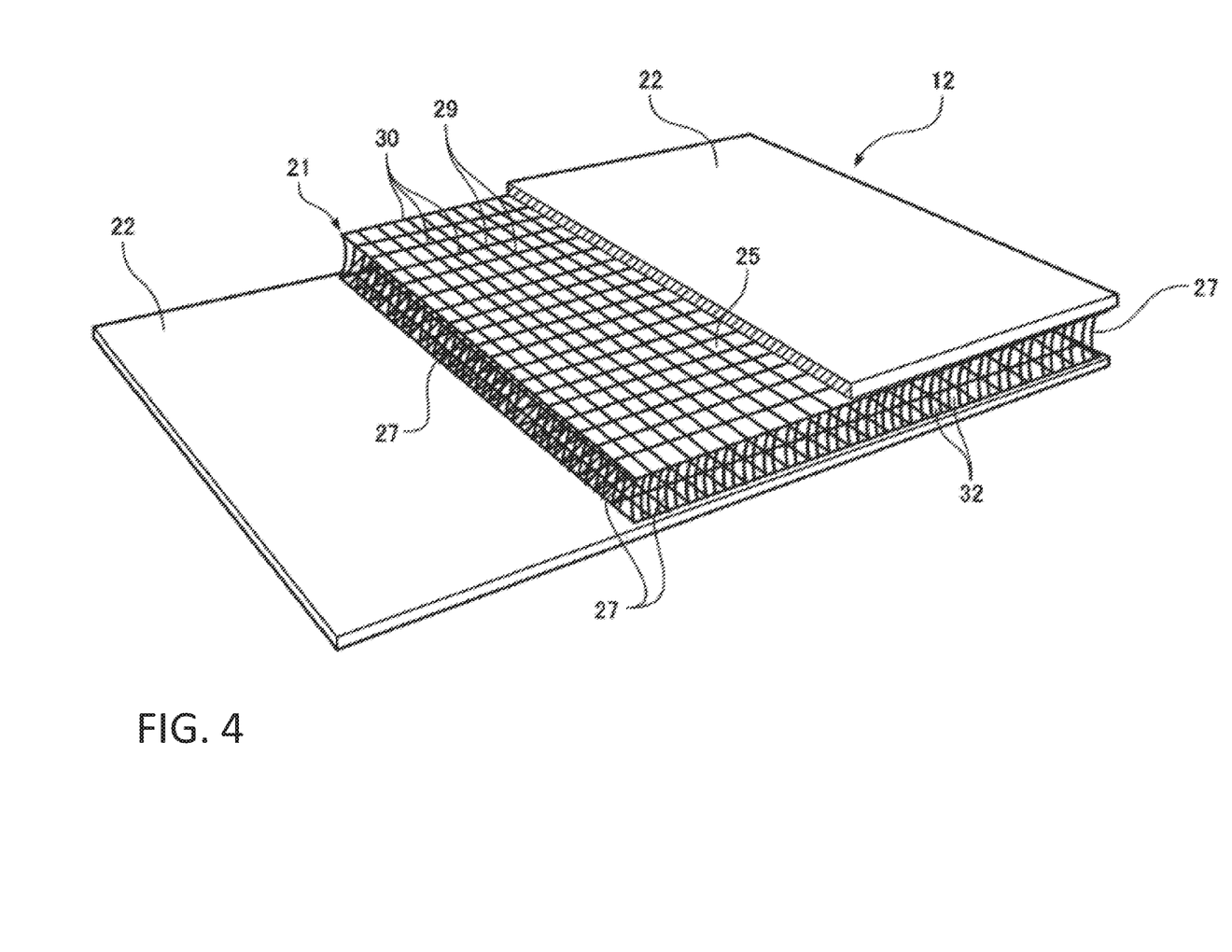
FIG. 4 is a perspective view with a partial cutaway showing a structure of the membrane element of the membrane separation device according to the first embodiment of the present invention.

An inner wall 17 of the water collecting case 11 is provided with a plurality of through holes extending vertically, such that the left or right side ends of the membrane elements 12 are inserted into the through holes so as to protrude into the water collecting space 15, as shown in FIG. 3. Each membrane element 12 is, for example, a flexible, quadrangular-shaped sheet member, and includes a flowpath member 21 and filtration membranes 22 joined to both of the front and back surfaces of the flowpath member 21, as shown in FIG. 4.

As shown in FIGS. 4 to 7, the flowpath member 21 is a spacer fabric made of threads arranged into a three-dimensional structure. The flowpath member 21 includes a pair of bonding surfaces 25 (faces) each joined to the filtration membrane 22, and a large number of pile threads 27 (an example of coupling threads) connecting the pair of the bonding surfaces 25. Each of the bonding surfaces 25 is a textile (cloth) having a large number of warp threads 29 and woof threads 30 which intersect each other. The warp threads 29 and woof threads 30 are made of low-melting point yarn having a softening point T2 lower than a softening point T1 of the filtration membrane 22. The softening point is a temperature at which the resin or the like is softened and become deformable. For example, the warp threads 29 and the woof threads 30 are made of polyethylene (PE) yarn having a softening point T2 of about 80° C. to 120° C. Each of the warp threads 29 and the woof threads 30 may be formed by twisting a plurality of thinner constituent threads into a single warp thread 29 or woof thread 30.

Figure 6:
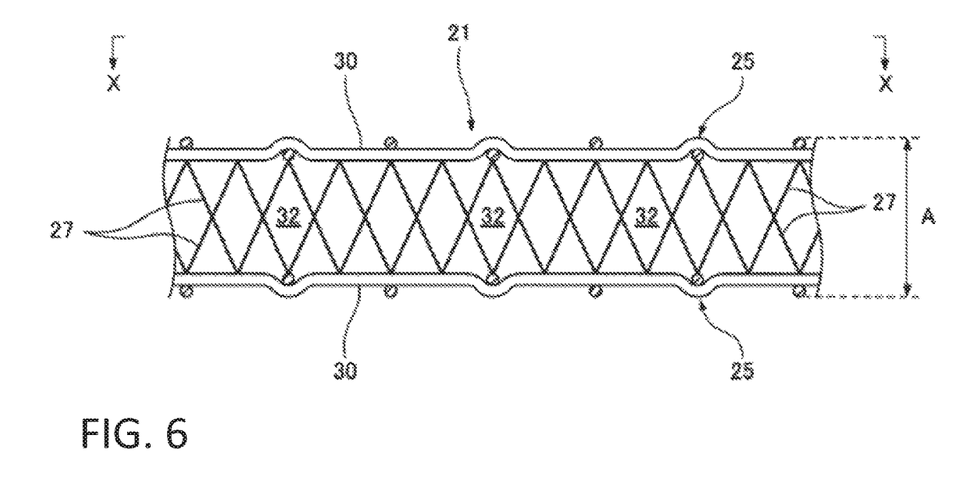
FIG. 6 is a diagram schematically showing an enlarged view of the cross section of the flowpath member of the membrane element according to the first embodiment of the present invention.
Figure 7:
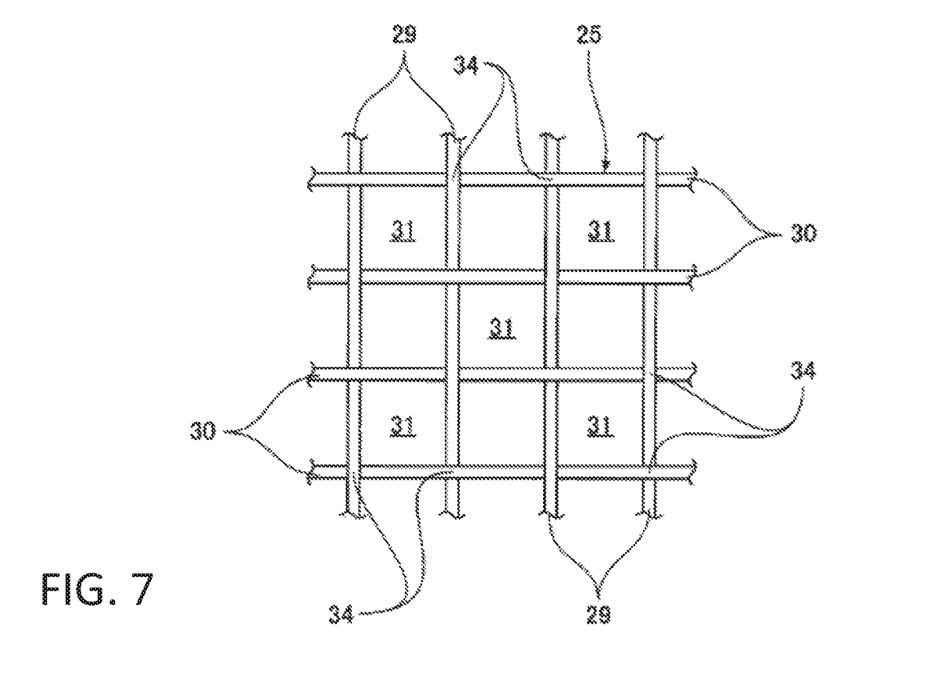
FIG. 7 is a view taken along the line XX in FIG. 6, schematically showing an enlarged view of the bonding surface of the flowpath member.

The pile threads 27 are made of high-melting point yarn having a softening point T3 higher than the softening point T2 of the warp and woof threads 29 and 30 (an example of the low melting point yarn forming the bonding surface 25). For example, the pile threads 27 may be polyethylene terephthalate (PET) yarn having the softening point T3 of 260° C. or higher. Minute spaces (gaps) 32 are formed between the pile threads 27, through which the permeated liquid 33 having passed through the filtration membrane 22 flows.

For example, the flowpath member 21 made of the spacer fabric as described above may employ yarn types as follows: the yarn type of the warp and woof threads 29 and 30 forming the bonding surface 25 (face) is SD84T24, the yarn type of the pile threads 27 is SD55T1, and the density of the pile threads 27 is about 380 threads/cm². In addition, a thickness A of the flowpath member 21 as a single member before manufacturing the membrane element 12 is, for example, about 2 mm to 5 mm. It should be noted that SD84T24 means that the twisted yarn has a thickness of 84 dtex and the number of the twisted threads (component yarn) is 24, while SD55T1 means that the twisted yarn has a thickness of 55 dtex and the number of twisted threads (component yarn) is one.

Figure 5:
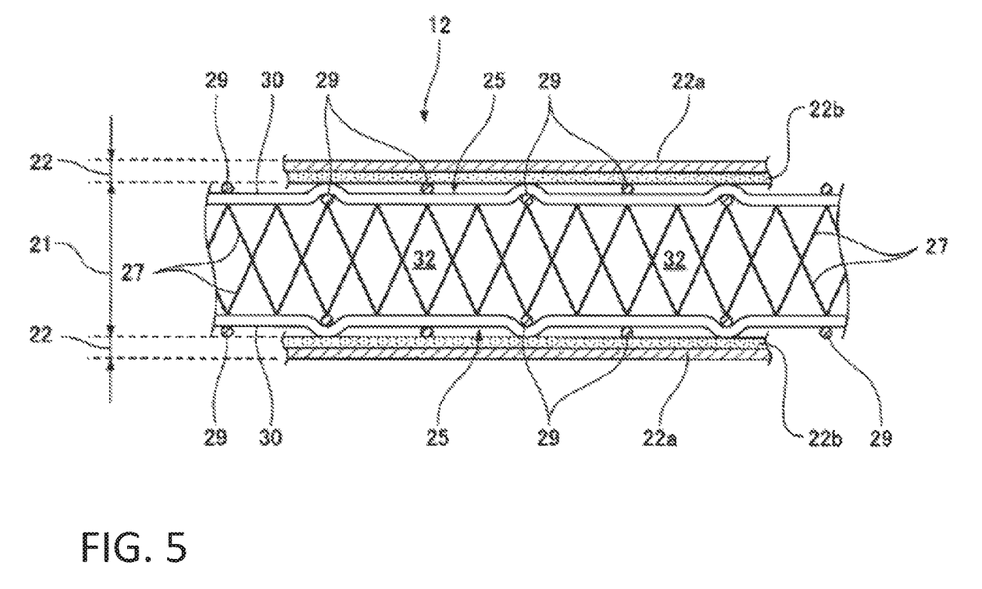
FIG. 5 is a diagram schematically showing an enlarged view of the cross section of the membrane element according to the first embodiment of the present invention.

The filtration membrane 22 has a porous resin layer 22a on the outer surface side thereof, and a resin-made support member 22b on the inner surface side. The resin layer 22a is a sheet of porous membrane having a large number of fine pores. The resin-made support member 22b may be a resin layer such as a non-woven fabric, and supports the porous resin layer 22a. For example, the material of the porous resin layer 22a may be polytetrafluoroethylene (PTFE), and the material of the resin-made support member 22b may be polyethylene-terephthalate (PET) having a softening point T1 of 260° C. to 280° C. (the softening point T1 of the filtration membrane 22). The softening point of polytetrafluoroethylene is about 330° C. to 350° C. which is higher than the softening point T1 of polyethylene-terephthalate.

The operation of the above configuration will be described below.

When the membrane element 12 is manufactured, the flowpath member 21 is disposed between a pair of filtration membranes 22. The three components of the flowpath member 21 and the pair of filtration membranes 22 are together inserted between a pair of upper and lower heating rolls, such that the three components are heated while compressed.

At this time, the heating is conducted such that the temperature of the warp and woof threads 29 and 30 forming the bonding surface 25 of the flowpath member 21 becomes equal to or higher than the softening point T2 thereof (that is, 80° C. to 120° C.) and yet lower than the softening point T1 of the resin-made support member 22b (that is, 260° C. to 280° C.). This allows the warp and woof threads 29 and 30 to soften such that the resin of the warp and woof threads 29 and 30 entangles with the resin-made support member 22b of the filtration membrane 22, whereby the filtration membrane 22 is joined to the bonding surface 25 of the flowpath member 21. In practice, since the heat during the rolling process is transferred from the upper and lower heating rolls to the warp and woof threads 29 and 30 through the filtration membrane 22, the heating temperature (the temperature of the heating roll) is set to 120° C. to 170° C. higher than the softening point T2.

Through this process, the filtration membrane 22 is joined to the flowpath member 21 by a number of contact points which are intersections of the warp threads 29 and the woof threads 30. Since the temperature of the heated warp and woof threads 29 and 30 is set equal to or higher than the softening point T2 thereof, and lower than the softening point T1 of the resin-made support member 22b, as described above, the filtration membrane 22 is prevented from softening. Accordingly, it is possible to prevent the pore size distribution of the filtration membrane 22 from changing, and the filtration membrane 22 from wrinkling.

As described above, since the membrane element 12 can be manufactured from the flowpath member 21 and the filtration membrane 22 alone, another member dedicated to adhesion such as an adhesive net is not necessary, the number of types of components (constituent parts) for the membrane element 12 can be reduced. The thickness of the membrane element 12 manufactured in this way is, for example, 1 to 3 mm.

Since the softening point T3 of the pile threads 27 is higher than the softening point T2 of the warp and woof threads 29 and 30, and is the same as that of the softening point T1 of the resin-made support member 22b, the temperature of the pile threads 27 heated by the heating rolls is lower than the softening point T3 thereof, as described above. Accordingly, the pile threads 27 are prevented from softening and deforming, which ensures that the minute spaces 32 serving as channels are reliably formed between and among the pile threads 27 within the flowpath member 21.

Since the membrane element 12 of the present invention is made by heating such that the filtration membrane 22 is fused to the flowpath member 21 (spacer fabric), unlikely to a conventional method, it does not use a dope which is dissolved in a solvent and directly applied to a surface of the spacer fabric to form a filtration membrane layer thereon. Thus, there is no such a risk as that the dope infiltrates into the minute spaces 32 in the flowpath member 21 and solidifies therein, blocking or obstructing the minute spaces 32 serving as channels for the permeated liquid 33.

As shown in FIGS. 1 to 3, a filtration operation for liquid to be treated 2 is performed by a plurality of membrane separation devices 5 immersed therein, each of which is provided with a plurality of flexible membrane elements 12 manufactured as described above. The liquid to be treated 2 is filtered by passing through the filtration membrane 22 of the membrane element 12 from the primary side to the secondary side, and then, as permeated liquid 33, flows into the minute spaces 32 of the flowpath member 21 through each opening 31 formed between the warp threads 29 and the woof threads 30 of the bonding surface 25 of the flowpath member 21 (See FIG. 7). The permeated liquid 33 flows through the minute spaces 32 out of the flowpath member 21 into the water collecting space 15 of the water collecting case 11 in each membrane separation device 5. The permeated liquid 33 thus collected in each water collecting case 11 communicates through the communication port 16 and then is taken out from the water collecting case 11 of the uppermost membrane separation device 5 to the outside of the treatment tank 3.

In the above-described embodiment, the warp and woof threads 29 and 30 are made of the low-melting point yarn having the softening point T2 lower than the softening point T1 of the resin-made support member 22b of the filtration membrane 22. However, instead of using such low-melting point yarn for all of the warp and woof threads 29 and 30, the bonding surface 25 may be such a textile in which the low-melting point yarn may is used for every few threads thereof. Alternatively, part of the warp and woof threads 29 and 30 may be made of the low-melting point yarn.

In the above-described embodiment, each of the warp and woof threads 29 and 30 may be formed by twisting a plurality of constituent threads, and one or more of the constituent threads of the warp and woof threads 29 and 30 may be made of the low-melting point yarn. In such a case, the low-melting point yarn may be made of polyethylene, and the constituent threads other than that made of polyethylene yarn may be made of polyethylene-terephthalate yarn.

In addition, either one of the warp and woof threads 29 and 30 may be made of the low-melting point yarn, and the other may be formed by twisting a plurality of constituent threads, where one or more of the plurality of constituent threads may be made of the low-melting point yarn.

In the above-described embodiment, polyethylene is used for the warp and woof threads 29 and 30. However, the present invention is not limited to this, and a polyolefin resin other than polyethylene may be used. In addition, although polyethylene-terephthalate is used for the pile threads 27, the material for the pile threads is not limited to this, and a polyester resin other than polyethylene-terephthalate may be used.

Second Embodiment

Figure 8:
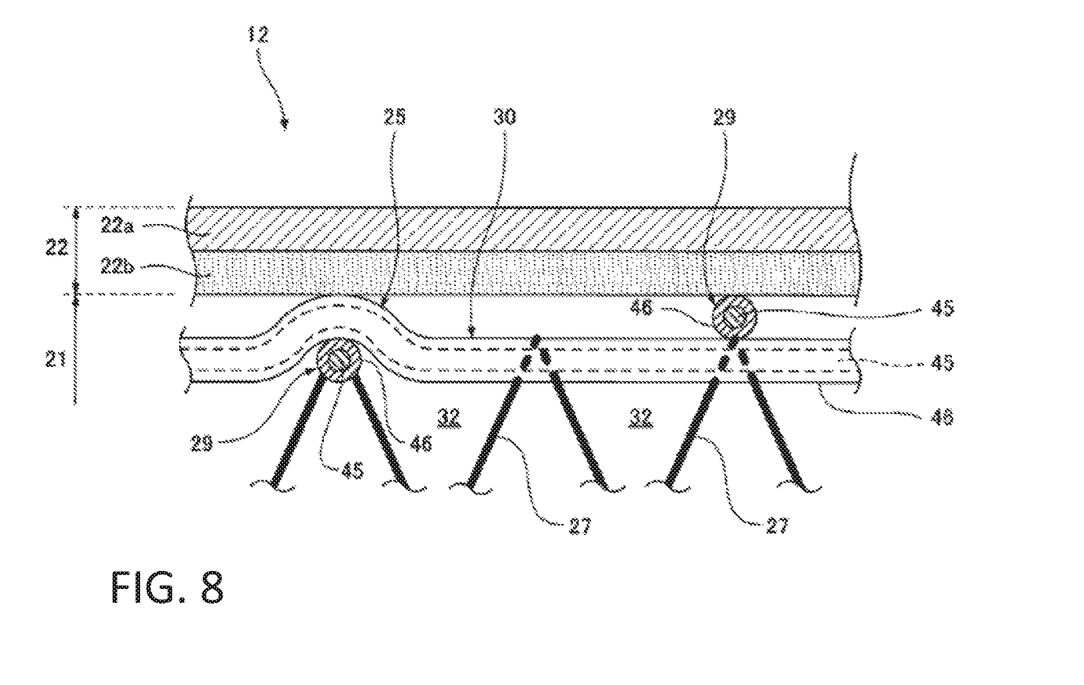
FIG. 8 is a diagram schematically showing an enlarged view of a cross section of a membrane element according to a second embodiment of the present invention.

In the second embodiment, as shown in FIG. 8, the bonding surface 25 of the flowpath member 21 is a textile having a large number of warp threads 29 and woof threads 30 which intersect with each other. The warp and woof threads 29 and 30 are made of composite yarn having a core material 45 and a sheath material 46 covering the outer surface of the core material 45.

The sheath material 46 has a softening point T4 lower than the softening point T1 of the resin-made support member 22b of the filtration membrane 22. For example, the sheath material 46 is made of polyethylene (PE) having a softening point T4 of about 80° C. to 120° C.

The core material 45 has a softening point T5 higher than the softening point T4 of the sheath material 46. For example, the core material 45 is made of polyethylene terephthalate (PET) having a softening point T5 of 260° C. or higher.

Accordingly, the flowpath member 21 is sandwiched between a pair of filtration membranes 22, and the three components of the flowpath member 21 and the pair of filtration membranes 22 are inserted together between a pair of upper and lower heating rolls so as to be heated while compressed.

The heating is performed such that the temperature of the heated warp and woof threads 29 and 30 forming the bonding surface 25 of the flowpath member 21 becomes equal to or higher than the softening point T4 of the sheath member 46 (that is, 80° C. to 120° C.), and lower than the softening point T1 of the resin-made support member 22b (that is, 260° C. to 280° C.). As a result, the sheath material 46 of the warp and woof threads 29 and 30 is softened such that the resin of the sheath material 46 of the warp and woof threads 29 and 30 is entangled with the resin-made support member 22b of the filtration membrane 22, whereby the filtration membrane 22 is joined to the bonding surface 25 of the flowpath member 21.

In this process, the filtration membrane 22 is joined to the flowpath member 21 by a number of contact points which are the intersections of the warp threads 29 and the woof threads 30. Since the temperature of the heated warp and woof threads 29 and 30 is set equal to or higher than the softening point T4 of the sheath material 46, and lower than the softening point T1 of the resin-made support member 22b, the filtration membrane 22 is prevented from softening.

In addition, since the softening point T5 of the core material 45 is higher than the softening point T4 of the sheath material 46, and the same as the softening point T1 of the resin-made support member 22b, when heated by the heating rolls as describe above, the temperature of the heated core material 45 is lower than the softening point T5 thereof, and thus the core material 45 is prevented from softening. Thus, by forming the core material 45 using a resin stronger than that of the sheath material 46, the strength of the bonding surface 25 can be improved and the rigidity of the flowpath member 21 can be increased.

In the above-described second embodiment, the composite yarn having the core material 45 and the sheath material 46 is used for the warp and woof threads 29 and 30. However, the warp and woof threads 29 and 30 may be twisted yarn formed by twisting a plurality of component threads, and one or more of such component threads may be such composite yarn having the core material 45 and the sheath material 46.

In the above-described embodiments, polyethylene is used for the sheath material 46, but the material is not limited to this, and a polyolefin resin other than polyethylene may be used.

In each of the above-described embodiments, the filtration membrane 22 has the porous resin layer 22a and the resin-made support member 22b. However, if the resin-made support member 22b is not required when forming the porous membrane, the filtration membrane 22 can be formed by the porous resin layer 22a alone.

In each of the above-described embodiments, the filtration membrane 22 is joined to each of the front and back surfaces of the flowpath member 21. However, the filtration membrane 22 is joined to either one of the front and back surfaces of the flowpath member 21, and the other surface may be made watertight.

In each of the above-described embodiments, the bonding surface 25 of the flowpath member 21 is a textile having a large number of the warp and woof threads 29 and 30 which intersect with each other. However, the bonding surface 25 is not limited to such a fine lattice textile in which the warp threads 29 and the woof thread 30 are woven into a lattice-shaped texture, but other types of texture can be used.

In each of the above-described embodiments, the softening points T1 though T5 are used as indexes, but the melting points may be used as indexes instead of the softening points T1 to T5. If the melting points are used as the indexes, the same temperature relationships as that of the corresponding softening points T1 to T5 hold.

In addition, the materials such as polyethylene, polyethylene terephthalate, polytetrafluoroethylene and the like and the associated numerical values mentioned in each of the above embodiments are examples, and the present invention is not limited to these specific materials and numbers.

What is claimed is:

1. A membrane element, comprising:
   a filtration membrane; and
   a flowpath member joined to the filtration membrane,
   wherein the flowpath member is formed of threads arranged into a three-dimensional structure, the flowpath member including:
   a pair of outer bonding surfaces, which are main surfaces of the three-dimensional structure, in direct contact with and bonding to the filtration membrane; and
   a plurality of coupling threads connecting the pair of outer bonding surfaces to each other, thereby forming inner spaces within the three-dimensional structure, through which permeated liquid permeated through the filtration membrane flows,
   and wherein at least part of the threads forming the pair of outer bonding surfaces is low-melting point yarn having a softening point lower than that of a material forming the filtration membrane, and the plurality of coupling threads have a softening point higher than that of the low-melting point yarn forming the outer bonding surface.

2. The membrane element according to claim 1,
   wherein the low-melting point yarn is formed of a core material and a sheath material covering the core material,
   and wherein the sheath material has a softening point lower than that of the material forming the filtration membrane, while the core material has a softening point higher than that of the sheath material.

3. The membrane element according to claim 1, wherein the low-melting point yarn is made of a polyolefin resin.

4. The membrane element according to claim 2, wherein the sheath material is a polyolefin resin.

5. The membrane element according to claim 1, wherein the coupling threads are made of a polyester resin.

6. The membrane element according to claim 1, wherein the filtration membrane includes a porous membrane made of polytetrafluoroethylene (PTFE).

7. A membrane separation device comprising:
   a plurality of membrane elements each according to claim 1; and
   a support member supporting the plurality of membrane elements, the support member having a water collecting space therein,
   wherein an end of each of the plurality of membrane elements is inserted into the water collecting space, whereby the permeated liquid flows into the water collecting space through the inner spaces of the flowpath member.

8. The membrane element according to claim 1, wherein only part of, but not all of, the threads forming the outer bonding surface is low-melting point yarn.

9. The membrane element according to claim 1, wherein the outer bonding surface of the flowpath member is formed into a textile, in which the low-melting point yarn is used for every few threads of the textile, or the low-melting point yarn is used for either one of warp threads or woof threads of the textile.

10. A membrane element, comprising:
a filtration membrane; and
a flowpath member joined to the filtration membrane,
wherein the flowpath member is formed of threads arranged into a three-dimensional structure, the flowpath member including:
a pair of outer bonding surfaces, which are main surfaces of the three-dimensional structure, in direct contact with and bonding to the filtration membrane; and
a plurality of coupling threads connecting the pair of outer bonding surfaces to each other, thereby forming inner spaces within the three-dimensional structure, through which permeated liquid permeated through the filtration membrane flows,
and wherein the threads forming the outer bonding surface is formed by twisting a plurality of constituent threads, and at least one of the constituent threads is low-melting point yarn having a softening point lower than that of a material forming the filtration membrane, and the plurality of coupling threads have a softening point higher than that of the low-melting point yarn forming the outer bonding surface.

11. The membrane element according to claim 10,
wherein the low-melting point yarn is formed of a core material and a sheath material covering the core material,
and wherein the sheath material has a softening point lower than that of the material forming the filtration membrane, while the core material has a softening point higher than that of the sheath material.

12. The membrane element according to claim 10, wherein the low-melting point yarn is made of a polyolefin resin.

13. The membrane element according to claim 11, wherein the sheath material is a polyolefin resin.

14. The membrane element according to claim 10, wherein the coupling threads are made of a polyester resin.

15. The membrane element according to claim 10, wherein the filtration membrane includes a porous membrane made of polytetrafluoroethylene (PTFE).

16. A membrane separation device comprising:
a plurality of membrane elements each according to claim 10; and
a support member supporting the plurality of membrane elements, the support member having a water collecting space therein,
wherein an end of each membrane element is inserted into the water collecting space, whereby the permeated liquid flows into the water collecting space through the inner spaces of the flowpath member.

17. The membrane element according to claim 10, wherein only part of, but not all of, the constituent threads forming the outer bonding surface is low-melting point yarn.

18. The membrane element according to claim 10, wherein the outer bonding surface of the flowpath member is formed into a textile, in which the low-melting point yarn is used for every few threads of the textile, or the low-melting point yarn is used for either one of warp threads or woof threads of the textile.

* * * * *